March 15, 1927. 1,621,206
A. KACZIBA
STEERING DEVICE
Filed July 19, 1926   2 Sheets-Sheet 1
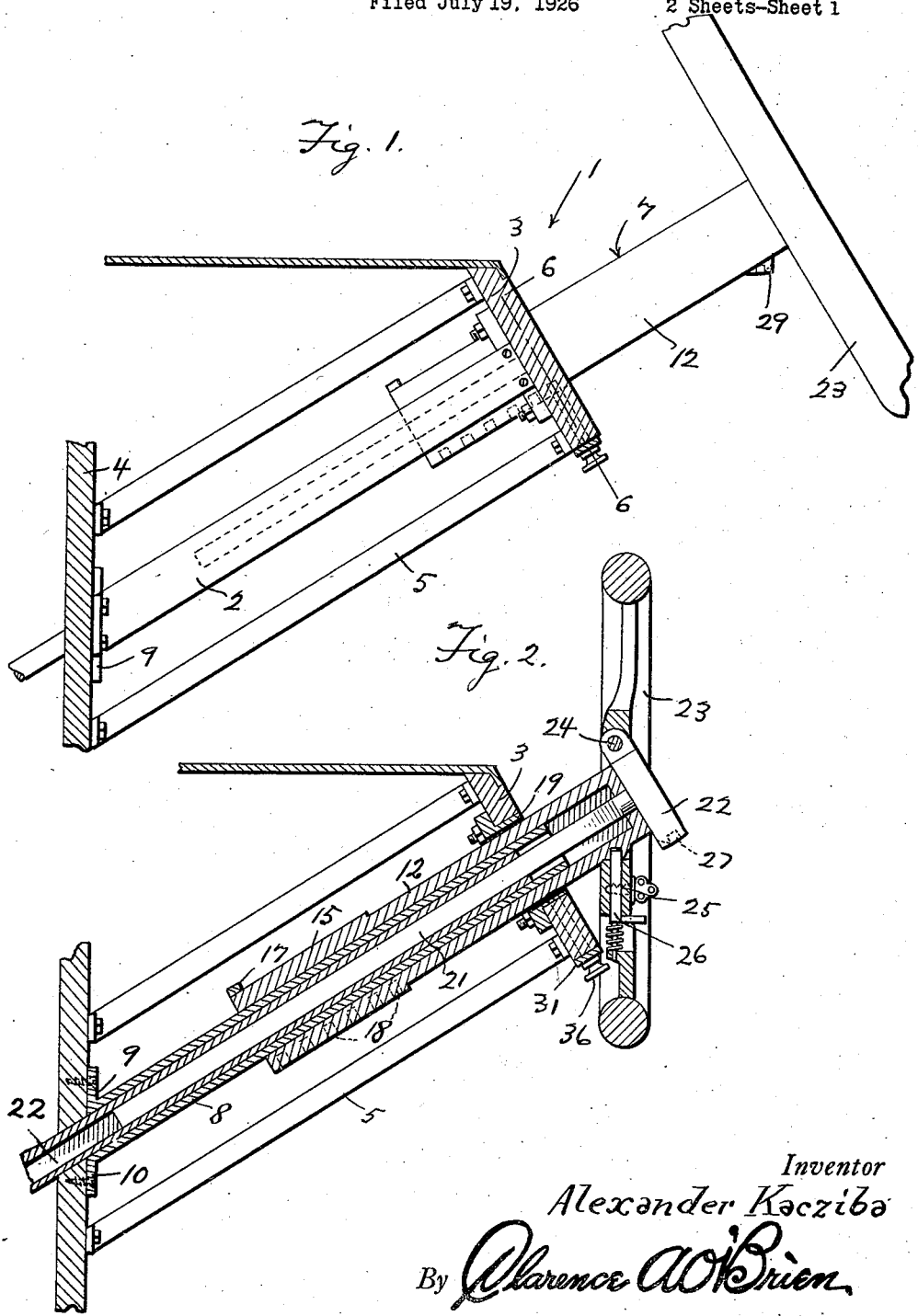
Inventor
Alexander Kacziba
By Clarence A. O'Brien
Attorney

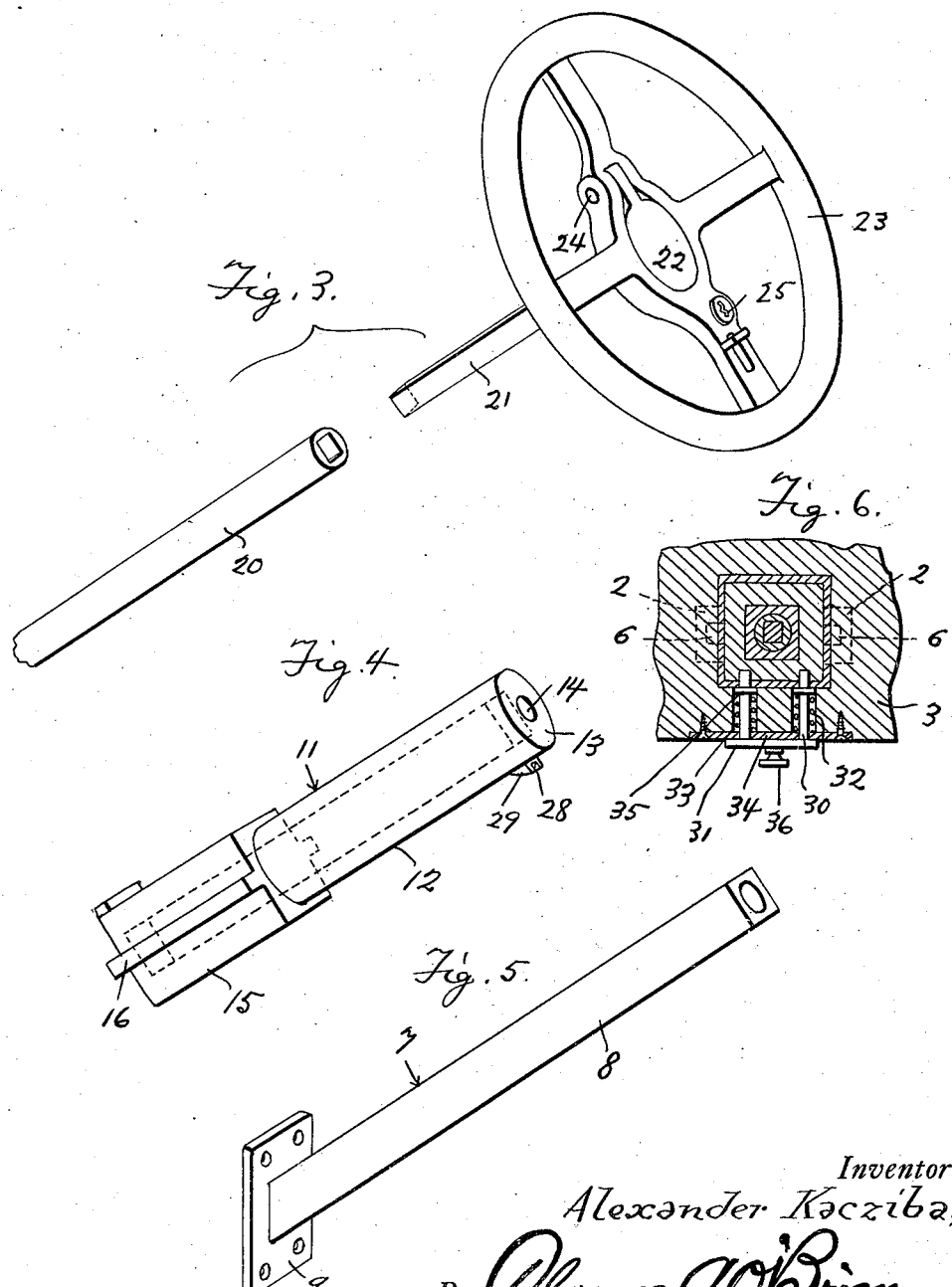

Patented Mar. 15, 1927.

1,621,206

UNITED STATES PATENT OFFICE.

ALEXANDER KACZIBA, OF SAN ANTONIO, TEXAS.

STEERING DEVICE.

Application filed July 19, 1926. Serial No. 123,474.

The present invention relates to improvements in steering devices for automobiles and has for its principal object to provide a steering post that will be more convenient to operate than the ordinary steering posts now generally used, the steering device being of such construction as to permit the steering wheel to be brought into position for convenient manipulation by the driver of the automobile and to allow of the adjustment of the steering column and post to permit convenient access to or egress from the driver's seat.

Another important object of the invention is to provide a steering device of the above mentioned character which includes an extensible steering column as well as an extensible steering post, means being provided for locking the extensible member in any adjusted position to suit the convenience of the driver, additional means being provided to permit the steering wheel to be tilted or swung to an inoperative position in order to further permit the operator to more easily enter or leave the automobile.

A futher object is to provide a steering device of the above mentioned character which is simple in construction, inexpensive, strong, and durable and further well adapted to the purpose for which it is designed.

Other objects and advantages of the invention will become apparent during the course of the following description taken in connection with the accompanying drawings.

In the accompanying drawings forming a part of this application and in which like numerals indicate like parts throughout the several views:

Figure 1 is a side elevation of the steering device embodying my invention showing the same in its extended position.

Figure 2 is a longitudinal sectional view through the device showing the parts in their retracted or operative position and further showing the steering wheel locked in its tilted position.

Figure 3 is a detail perspective view of the complementary sections comprising the steering post and showing the steering wheel which is associated with the upper end of the uppermost section.

Figure 4 is a detail perspective of one of the sections forming the steering column.

Figure 5 is a similar view of the lower section of the steering column, and

Figure 6 is a sectional view taken approximately on line 6—6 of Figure 1.

In the drawings wherein for the purpose of illustration is shown the preferred embodiment of my invention, the numeral 1 designates generally my improved steering device, the same comprising a pair of spaced bars 2 which extend between the dash board 3 and the floor board 4 of an automobile, and these bars are secured to the dash board and floor board in any suitable manner. Suitable bracing means shown at 5 also extend between the dash board and floor board. The spaced bars 2 are formed on their inner opposed side faces with the longitudinally extending guide grooves or channels, the purpose of which will be hereinafter more fully described.

Forming a part of my improved steering device is the extensible steering column which comprises the complementary sections 7 and 8 respectively. The lower section 7 comprises the elongated tubular member 8, the same being substantially rectangular in cross section, the bore of this tubular member being cylindrical as is clearly disclosed in Figure 5. An attaching flange 9 is formed on the lower end of the tubular member 8 and adapted to be secured to the floor board 4 by any appropriate fastening means such as is shown at 10.

The complementary section 11 of the extensible steering column comprises the sleeve member 12. The upper end of the sleeve 12 is closed as illustrated at 13. The bore of the sleeve 12 is substantially rectangular and is of such size as to slidably fit over the square shaped member 8 which forms a part of the lower section 7, thereby preventing the rotation of the steering column. The upper closed end 13 of the sleeve 12 is provided with a central opening 14 which communicates with the bore of the sleeve in the manner clearly shown in Figure 4.

A substantially square shaped enlargement 15 is formed on the lower end of the sleeve 12 and formed on one pair of opposed sides of the enlargement 15 are the longitudinally extending rib 16, the same being adapted for slidable movement within the respective guide channels or grooves 6 provided therefor in the spaced bars 2.

The upper section 11 of the steering column is adapted for slidable movement through a suitable opening provided therefor in the dash board 3 and for the purpose of limiting the upward sliding movement of the section 11, there is formed on the upper face of the enlarged portion 15 a stop 17. A series of spaced openings 18 are formed in the bottom face of the enlarged portion 15, and the purpose thereof will be hereinafter more fully described. A bushing 19 is disposed within the opening formed in the dash board 3 for the upper section 11 of the extensible steering column as is clearly shown in Figure 2.

The extensible steering post also forming a part of the present invention comprises the lower tubular section 20 which is cylindrical so as to be adapted for slidable movement within the tubular section 8 of the steering column, but the bore of the tubular section 20 is substantially rectangular in cross section as is clearly shown in Figure 3 for accommodating the square shaped rod 21 which forms the upper section of the steering post. This rod 21 extends upwardly through the sleeve 12 of the section 11 of the steering column, and the upper end of the rod is rounded and extends through the opening 14 formed in the closed end 13 of the sleeve in the manner clearly shown in Figure 2. The lower portion of the tubular section 20 of the steering post is adapted to be operatively connected with the steering knuckle or the steering mechanism of the automobile in any suitable manner, and as this forms no important part of the present invention, a detailed description thereof is thought unnecessary.

A steering wheel supporting head 22 is secured on the upper end of the rod 21 and the steering wheel 23 is pivotally supported on the head as at 24 so that the steering wheel may be disposed at right angles to the steering post when in an operative position or may be tilted or swung downwardly to the position shown in Figure 2 when in an operative position. A key-actuated lock designated generally by the numeral 25 is carried by the steering wheel 23 and the sliding bolt 26 which forms a part of this lock is adapted to enter a suitable recess 27 provided therefor in the head 22 whereby the steering wheel will be locked in an operative position. A suitable recess 28 is formed in a lug 29 which is formed on the upper portion of the sleeve 12, and this recess is adapted to receive the slidable bolt 26 for locking the steering wheel in its tilted position in the manner clearly shown in Figure 2. When the steering device is arranged in the manner shown in Figure 2, it will be noted that the steering wheel is disposed adjacent the dash board of the automobile, and sufficient room is provided whereby the operator may readily and easily enter and leave the car without necessarily coming in contact with the steering device. After the driver has entered the car and occupied his seat, the steering device may be moved to an operative position by releasing the bolt 26 from engagement with the recess 28 in the lug 29 and swinging the steering wheel 23 upwardly on its pivot 24 so that the bolt 26 will enter the recess 27 provided in the head 22 and thereby locking the steering wheel in proper position on the upper end of the steering post. An upward pull is then exerted on the steering wheel and as a result, the upper section 11 of the steering column as well as the upper section or rod 21 of the steering post will move upwardly through the opening provided therefor in the dash board and when the steering wheel has been moved to the proper position with respect to the driver so that the same may be easily and efficiently manipulated, the parts are locked in their adjusted positions by means of the spring urged latch bolts 30 which are carried by a plate 31 and which extend inwardly through suitable recesses 32 provided therefor in the dash board 3, and the inner ends of these latch bolts are adapted to enter one pair of recesses 18 formed in the bottom face of the enlarged portion 15 as is clearly shown in Figure 6. Suitable coil springs 33 encircle the latch bolts 30 and are disposed within the recesses 32 between a suitable closure plate 34 provided for the recesses and the stop collars 35 formed on the latch bolts adjacent the inner ends thereof. The latch bolts are retracted and disengaged from the recesses 18 in the enlarged portion 15 of the upper section 11 of the steering column by grasping and pulling outwardly on the knob or handle 36 which is carried by the plate 31.

It will thus be seen from the foregoing description, that I have provided a highly novel, yet simple steering device which may be readily and easily installed on automobiles of various constructions or types, and will not necessitate any material alterations of the parts of the vehicle with which the device may be associated. The usual spark and gas control levers which are mounted on the steering device are preferably supported or arranged on the dash board within easy access of the operator.

While I have shown the preferred embodiment of my invention, it is to be understood that minor changes in the size, shape, and arrangement of parts may be resorted to without departing from the spirit of the invention and the scope of the appended claims.

Having thus described the invention, what I claim as new and desire to secure by Letters Patent is:—

1. In a steering device of the class described, an extensible steering column including a stationary lower section and a slidable upper section disposed over the lower section, an extensible steering post adapted for rotation within said steering column, a steering wheel secured on the upper end of the steering post, and means for adjustably securing the steering post in any extended position, said means comprising a latch, the slidable section of said extensible steering column being provided with spaced recesses for cooperation with said latch.

2. A steering device of the class described, an extensible steering column comprising a stationary lower section, and an upper section slidably disposed over the lower section, the slidable upper section of the steering column adapted to extend through the dash board of an automobile, an extensible steering post adapted for rotation within the extensible steering column, said steering post comprising telescopic sections, the upper section of the steering post extending upwardly through the slidable section of the steering column and adapted for simultaneous sliding movement therewith, a steering wheel secured on the upper end of the uppermost section of said steering post, and means for adjustably securing the steering column and steering post in any extended position.

3. A steering device of the class described, an extensible steering column comprising a stationary lower section, and an upper section slidably disposed over the lower section, the slidable upper section of the steering column adapted to extend through the dash board of an automobile, an extensible steering post adapted for rotation within the extensible steering column, said steering post comprising telescopic sections, the upper section of the steering post extending upwardly through the slidable section of the steering column and adapted for simultaneous sliding movement therewith, a steering wheel secured on the upper end of the uppermost section of said steering post, means for adjustably securing the steering column and steering post in any extended position, said means comprising a latch mounted in the dash board, the upper slidable section of the steering column being provided with spaced recesses for cooperation with said latch.

4. A steering device of the class described, an extensible steering column comprising a stationary lower section, and an upper section slidably disposed over the lower section, the slidable upper section of the steering column adapted to extend through the dash board of an automobile, an extensible steering post adapted for rotation within the extensible steering column, said steering post comprising telescopic sections, the upper section of the steering post extending upwardly through the slidable section of the steering column and adapted for simultaneous sliding movement therewith, a steering wheel secured on the upper end of the uppermost section of said steering post, means for adjustably securing the steering column and steering post in any extended position, and guide means for the slidable upper section of the extensible steering column.

In testimony whereof I affix my signature.

ALEXANDER KACZIBA.